United States Patent Office 3,387,057
Patented June 4, 1968

3,387,057
PHENOLIC RUBBER ANTIOXIDANTS
Martin B. Neuworth, Pittsburgh, and Frederic W. Hammesfahr, Bethlehem, Pa., assignors to Consolidation Coal Company, Pittsburgh, Pa., a corporation of Delaware
No Drawing. Continuation of application Ser. No. 479,303, Aug. 12, 1965. This application Apr. 26, 1967, Ser. No. 637,314
3 Claims. (Cl. 260—810)

ABSTRACT OF THE DISCLOSURE

The use of 4,6-dinonyl-o-cresol as a deterioration retarder for rubber is described.

---

This application is a continuation of our application, Ser. No. 479,303, filed Aug. 12, 1965, which is a continuation-in-part of our application, Ser. No. 161,267, filed Dec. 21, 1961, both applications being assigned to the assignee of the present application, both applications now abandoned.

This invention relates to the preservation of rubber, and, more particularly, to the use of 4,6-dinonyl-o-cresol as an age resister or deterioration retarder for rubber.

This compound requires no synergistic activation. By itself it uniquely possesses a combination of highly useful properties: It acts as an effective antioxidant with respect to rubber and rubber compositions; it imparts to these compositions excellent flex-cracking resistance; and it exerts a bleaching or whitening effect when incorporated in white rubber compositions. This compound is outstanding with respect to its non-staining and non-discoloring properties when used in light-colored and white rubber compositions and also when used in black rubber compositions, such as used in automobile tires, which are vulcanized in contact with white or light-colored surface layers of rubber, such as the white sidewalls of automobile tires.

Both cured and uncured natural and synthetic elastomers are subject to deterioration from many sources. Thus, vulcanized rubber compositions deteriorate with age and use as a result of exposure to sunlight, ozone, atmospheric oxygen, presence of metal catalysts, high temperature, repeated flexing, and the like. With increased use of white or light-colored rubber articles, there is also a need for antioxidants which do not discolor rubber or stain objects in contact with rubber. These non-staining and non-discoloring properties are also important when the antioxidant is used in black rubber compositions which are in contact with white rubber because of migration of the antioxidant from one rubber layer to another.

Various antioxidants have been proposed and are in use for overcoming the foregoing problems. None of them are wholly satisfactory in all respects. Certain aryl amines are highly effective antioxidants, but are generally undesirable in many applications because they have staining and discoloring properties to a greater or lesser extent. Alkylated phenols have generally been proposed as antioxidants which produce little discoloration or staining. However, these compounds vary markedly in their properties. While many phenols have some antioxidant activity, there is a great difference between various phenols as to their antioxidant effectiveness and also as to their degree of discoloration of rubber goods. Other phenols, while showing satisfactory antioxidant and non-staining, non-discoloring properties, show relatively poor flex-cracking resistance. Others are relatively expensive, involving elaborate synergistic mixtures, complex methods of synthesis, or expensive starting materials, and hence lack commercial interest.

With respect to the trialkylated phenols which have been broadly proposed as rubber antioxidants, many theories have been advanced and proposals set forth aimed at securing the ideal antioxidant from among the thousands of compounds available. Thus it has been recognized that for high-temperature uses and for uses wherein large rubber surfaces are exposed, the vapor pressure of the phenolic molecule may be of particular importance. At the same time, the degree of alkylation, the type of alkyl groups present, and the location of the substituent alkyl groups will also determine the effectiveness of a phenolic antioxidant. However, compromises must frequently be made since a proposed structural model may not be readily synthesizable; or a good antioxidant may be too volatile for general use while, on the other hand, a non-volatile material may be a poor antioxidant. Furthermore, both types of compounds may discolor white rubber goods or show poor flex-cracking resistance.

It has further been postulated that the phenolic hydroxyl group must be hindered in order to have an effective antioxidant. For this purpose, large groups present in the positions ortho to the hydroxyl group have been considered desirable. Where a methyl group has been present on the molecule of a trialkylated phenol used as an antioxidant, it has invariably been restricted to the para position. Thus it has been proposed to prepare a mixture of alkyl phenols by first alkylating phenol with a heavy tertiary alkyl group, such as tertiary octyl or tertiary nonyl, and then alkylating the product with another tertiary alkyl group such as a tertiary butyl or a tertiary amyl group. Only mixtures, varying in uniformity, can be obtained by such techniques because of the mobility and isomerization interchange of tertiary alkyl groups on the molecule. In addition, such methods involve more elaborate syntheses and hence the resulting products may be costly and at an economic disadvantage.

Accordingly, it is an object of this invention to provide an antioxidant composition which is capable of protecting rubbers for extended periods of time. It is another object to provide a rubber antioxidant effective at elevated temperatures. It is still another object to provide a rubber antioxidant which is outstanding in its non-discoloring and non-staining properties when incorporated in white rubber stocks, effectively exerting a whitening action thereon. It is yet another object to provide an economical rubber antioxidant having the foregoing properties and which further imparts excellent flex-cracking resistance to vulcanized rubber compositions.

We have discovered that despite the teaching of the art with respect to hindering the hydroxyl group by having tertiary alkyl groups present in both ortho positions, an elastomer having enhanced age-resisting properties may be prepared by incorporating therein an antioxidant amount of 4,6-dinonyl-o-cresol. This dinonylated o-cresol compound is useful in preventing deterioration due to the action of heat, light, and oxygen in both vulcanized and nonvulcanized, natural and synthetic rubber articles. About 0.2 to 5 parts by weight of 4,6-dinonyl-o-cresol per 100 parts of rubber present are preferred for the purposes of this invention. Particularly preferred are between 0.5 and 3 parts by weight. 4,6-dinonyl-o-cresol may also be used in the processing of nonvulcanized articles and in the preservation of raw or bulk natural or synthetic rubbers, prior to their use in manufacture and especially in storage. By incorporation of 4,6-dinonyl-o-cresol in the rubber prior to vulcanization, preferably with sulfur, sulfur-vulcanized rubbers are obtained having excellent flex-resisting properties in addition to their antioxidant properties. Furthermore, when incorporated in white rubber stock prior to vulcanization, a bleaching effect is apparently obtained so that the whiteness of the vulcanized white rubber is actually enhanced. Thus this compound is outstanding in imparting non-staining and non-discoloring properties to white rubber stocks. Generally, conventional non-staining and non-discoloring rubber antioxidants still impart a slight off-color to white or light-colored rubber stocks.

The term "elastomer" or "rubber" as used herein in both the specification and claims, includes both natural rubber and synthetic diene rubbers and is considered synonymous with the term "rubbery polymer." It is used in a broad generic sense to include all natural and synthetic diene rubbers whether or not admixed with filler, pigments, vulcanizing agent, accelerating agent and the like. The term "rubber composition" refers to a compounded rubber, whether vulcanized or not. Further, the terms "synthetic rubber," "rubber-like polymer," "synthetic elastomer," and "rubber composition" are all explicitly limited to that group of carbon-chain high polymers which possess, to a greater or lesser extent, the physical properties of natural rubber. These polymers have an unsaturated carbon chain and are derived from conjugated diolefins such as butadiene and isoprene. Such homopolymeric and copolymeric synthetic elastomers are characterized as diene rubbers. Representative diene synthetic elastomers are: polyisoprene having an essentially all-cis configuration, butadiene-styrene copolymer (known as SBR rubber), polychloroprene, butadiene-2,3-dimethyl butadiene copolymer, poly 2,3-dimethyl butadiene (known as methyl rubber), poly 2-chloro-3-methyl-butadiene - 1,3 - butadiene-dichlorostyrene copolymer, butadiene - monochlorostyrene copolymer, butadiene-alpha-methylstyrene copolymer, butadiene - p - methoxystyrene copolymer, butadiene-dimethylstyrene copolymer, butadiene-dimethoxystyrene copolymer, butadiene-alpha-methyl-p-methylstyrene copolymer, butadiene-p-phenyl styrene copolymer, isoprene-styrene copolymer, isoprene-butadiene copolymer, 2-isopropyl butadiene-styrene copolymer, 2-ethyl butadiene-styrene copolymer, 2-n-amyl-butadiene-styrene copolymer, polybutadiene, poly 2-ethyl butadiene, poly 2-isopropyl butadiene, poly 2-n-amyl butadiene, polycis-piperylene, butadiene-1-cyanobutadiene copolymer, isoprene-chloroprene copolymer, poly 2-fluorobutadiene, and butadiene - 2 - methyl-4-methoxy-5-isopropyl styrene copolymer. Butadiene-acrylonitrile copolymer, butadiene-methyl isopropenyl ketone copolymer, and chloroprene-methylisopropenyl ketone copolymer are representative examples of other elastomers which may be used.

In general, about 2 to 3 parts of sulfur per 100 parts of rubber is necessary to effect a cure in the presence of appropriate accelerators. Uncured white rubber stock may be easily compounded with the liquid 4,6-dinonyl-o-cresol without increasing scorchiness. Vulcanization is accomplished by heating the compounded stock (usually in a mold) at a temperature of about 100 to 180° C. for a period ranging from about a half hour to several hours. Various modifications of this sulfur-curing technique may be employed depending upon the stock. Such procedures and modifications of sulfur-curing methods are well-known and described in the art.

Where it is desired to add the antioxidant in the form of a solid to the other ingredients, this may be conveniently accomplished by the prior absorption of the 4,6-dinonyl-o-cresol on any convenient filler, extender, or pigment having absorptive properties. Preferred are those finely divided, porous inorganic fillers conventionally used in the rubber art for these purposes, such as whiting (calcium carbonate), diatomaceous earth, diatomite, magnesium oxide, and any of various natural and synthetic silicates. Conveniently, 4,6-dinonyl-o-cresol may be absorbed on a synthetic calcium silicate having a high absorptive capacity, large surface area, and finely divided particle size, having a concentration of active ingredient of approximately 60–80 percent. White rubber stocks compounded with such a "solid" antioxidant show outstandingly excellent color retention.

(1) PREPARATION OF 4,6-DINONYL-o-CRESOL 4,6-dinonyl-o-cresol is conveniently obtained by reacting orthocresol with nonene at a temperature between 50 and 150° C. in the presence of a Friedel-Crafts alkylation catalyst. Commercially available nonene is a tripropylene (propylene trimer) and consists essentially of a mixture of nonenes having branched-chain nonyl groups. Because of the stability of the methyl group in o-cresol, the nonylated products obtained consist only of 4-nonyl-o-cresol and 4,6-dinonyl-o-cresol. From 1 to 3 moles of nonene are reacted per mole of o-cresol. An excess of nonene favors an increase in conversion of the o-cresol to the dinonylated o-cresol derivative. The following is an illustrative, but non-limiting, exemplification of this reaction.

Example 1

Orthocresol (30.5° material: 99.7 percent o-cresol, 0.3 percent phenol) was topped to remove water, and 577.6 gms. of the dried feedstock (0.005 percent water) was charged to a reaction flask and heated to 38° C. Heating was discontinued and $BF_3$ was added above the stirred liquid surface. Approximately 18 minutes were required for the addition of 9.6 gms. $BF_3$ (1.6 weight percent based on o-cresol). During this addition the temperature was maintained at 38–45° C. by controlling the feedrate of $BF_3$. One hour was allowed for absorption of $BF_3$ vapors in the flask, and the $BF_3$ feed line was then replaced by a dropping funnel. After the reaction mixture was heated to 68° C., addition of the nonene (propylene trimer) was begun. The reaction was exothermic, and the temperature was maintained at 70–71° C. by controlling the nonene addition rate; no external heating or cooling was applied during any nonene addition in this run. After 800 gms. of nonenes had been added over 1.5 hours, the temperature began to fall off. Addition was stopped and the flask was heated to 70° C., whereupon the exothermic reaction again resumed. The reaction temperature was held at this new level, by controlled nonene addition, until 1240 gms. of nonenes had been added; here the temperature again fell off. Heating the reaction mixture to 75° C. again started the exothermic reaction, which was maintained at this temperature by controlling nonene feedrate throughout the remainder of the run. In all, 1421 gms. of nonenes were added to the o-cresol over a 3.5-hour period.

The reaction product was washed with 10 percent $Na_2CO_3$ solution to neutralize the catalyst and make the product very slightly alkaline. The phase separation gave no difficulty, and the aqueous layer was discarded. The washed product (2012 gms.) was then charged to a vigreux column for removal of water, unreacted nonenes, o-cresol, nonyl-o-cresol and dinonyl-o-cresol. Nonyl-o-cresol was recovered at 155–173° C./10 mm. Hg, and dinonyl-o-cresol distilled at 173–182° C./4.5 mm. Hg, which corresponds to about 191–202° C./10 mm. Hg.

Of the o-cresol charged, 99.3 percent was converted. Based on converted material, 51.4 percent was 4-nonyl-o-cresol and 48.6 percent consisted of 4,6-dinonyl-o-cresol. The 4,6-dinonyl-o-cresol obtained was a pale-yellow liquid having a specific gravity of .900–.910 and a refractive index ($n_D^{25}$) of 1.494–1.499. For optimum yield of 4,6-dinonyl-o-cresol, the 4-nonyl-o-cresol may be dealkylated, for recycle of the o-cresol thus obtained in the process; or the mononyl compound may be recycled for further conversion to 4,6-dinonyl-o-cresol.

(2) RUBBER STUDIES

Representative, non-limiting illustrations of the properties of rubber compositions having 4,6-dinonyl-o-cresol incorporated therein as a rubber antioxidant are shown in the following examples.

Example 2

A rubber base stock was prepared having the following composition:

| | Parts by weight |
|---|---|
| Pale crepe rubber (natural) | 100.0 |
| Titanium dioxide | 50.0 |
| Zinc oxide | 25.0 |
| Clay | 15.0 |
| Stearic acid | 1.0 |
| 2,2'-dithiobis(benzothiazole) | 0.6 |
| Diphenylguanidine | 0.15 |
| Sulfur | 3.0 |
| Antioxidant (as shown) | 1.5–2 |

A standard rubber laboratory procedure was used for compounding, and the rubber stocks were cured in accordance with ASTM D15–54T. The performance of 4,6-dinonyl-o-cresol was compared with that of three commercial non-staining rubber antioxidants as well as with the t-butyl homolog of 4,6-dinonyl-o-cresol. The results obtained are shown in Table I.

TABLE I.—EVALUATIONS AS NON-DISCOLORING ANTIDEGRADANTS

Creep: Method of Throdahl, Industrial and Engineering Chem. 40, 2,180 (1948) at 100° C., load 45 p.s.i. (1.5 parts antioxidant).
Discoloration: Samples exposed for 3 days in Fadeometer at 150° F. Discoloration measured by Photovolt Reflectometer (1.5 parts antioxidant).
Flexing: Samples were aged for 72 hours at 100° C. before flexing (2 parts antioxidant).

| | Creep (Hours to 50%) | Discoloration (72-hour final reflectance) | Flexing (Kilocycles to break) |
|---|---|---|---|
| Blank | 8 | 83 | 48 |
| 4,6-dinonyl-o-cresol | 30 | 83 | 179 |
| 4,6-di-t-butyl-o-cresol | 13 | 83 | 156 |
| 2,2'-methylenebis(4-methyl-6-t-butylphenol) | 40 | 81 | 212 |
| 2,2'-thiobis(4-methyl-6-t-butylphenol) | 26 | 80 | |
| Diphenylamine-diisobutylene | | | 148 |

As may be noted from the foregoing table, the 4,6-dinonyl-o-cresol was within the range of the commercial antioxidants, proving superior to several of them in all categories evaluated. Since the creep test is essentially a measure of the volatility of the antioxidant, simulating its effective life in use, the performance of the 4,6-di-t-butyl-o-cresol would be considered unacceptable for a commercial antioxidant.

Example 3

Air-oven aging data were obtained for 4,6-dinonyl-o-cresol, its lower and higher alkylated homologs, and three commercial bisphenolic non-staining antioxidants. The following rubber recipe was used:

| | Parts by weight |
|---|---|
| Pale crepe rubber (natural) | 100.00 |
| Zinc oxide | 50.00 |
| TiO$_2$ | 25.00 |
| Stearic acid | 2.00 |
| Ultramarine blue | 0.125 |
| Mercaptobenzothiazole | 1.00 |
| Sulfur | 3.00 |
| Antioxidant (as shown) | 1.00 |

The samples were cured for 40 minutes at 274° F. and then aged in an air oven for 48 hours at 100° C. (ASTM D412, D573). The tensile strength of the aged samples was compared with that of the unaged samples. The results obtained are shown in Table II. As may be noted from this table, the 4,6-di-nonyl-o-cresol was the most effective of the antioxidants evaluated. The di-t-butyl-o-cresol was ineffective, showing poorer tensile-strength retention than the blank.

TABLE II.—AIR-OVEN AGING FOR NON-STAINING ANTIOXIDANTS

| | Tensile strength (percent retention) |
|---|---|
| Blank | 54 |
| 4,6-dinonyl-o-cresol | 78 |
| 4,6-di-t-butyl-o-cresol | 43 |
| 4,6-didodecyl-o-cresol | 72 |
| 2,2'-methylenebis-6-t-butyl-p-cresol | 74 |
| Naugawhite (alkylated bisphenol) | 70 |
| Alkylated thiobisphenol | 69 |

Example 4

The effectiveness of the dinonyl-o-cresol was determined in both a white sidewall formulation and in a black tread formulation. Comparison was made against a blank, 4,6-didodecyl-o-cresol, and four commercial, non-discoloring phenolic antioxidants. For the white sidewall formulation, the following base stock was used:

| | Parts by weight |
|---|---|
| Pale crepe rubber (Natural) | 100.0 |
| Titanium dioxide | 50.0 |
| Zinc oxide | 25.0 |
| Clay | 15.0 |
| Stearic acid | 1.0 |
| 2,2'-dithiobis(benzothiazole) | 0.6 |
| Diphenylguanidine | 0.15 |
| Sulfur | 3.0 |
| Antioxidant (as shown) | 1.5 |

The following formulation was used for the black tread composition:

| | Parts by weight |
|---|---|
| Smoked sheets (natural rubber) | 100.0 |
| Furnace carbon black | 50.0 |
| ZnO | 5.0 |
| Stearic acid | 3.0 |
| Lubricant | 3.0 |
| n-Tert-butyl-2-benzothiazole sulfenamide | 0.5 |
| Sulfur | 2.5 |
| Antioxidant (as shown) | 1.5 |

The results obtained are shown in Table III.

TABLE III.—ANTIOXIDANT EVALUATION IN A WHITE SIDEWALL FORMULATION AND IN A BLACK TREAD FORMULATION

Air Bomb Aging: ASTM 454-52, at 121° C. and 80 p.s.i.
Creep: Method of Throdahl, Industrial and Engineering Chem. 40, 2,180 (1948) at 100° C., load 45 p.s.i.
Discoloration: Samples exposed for 3 days in Fadeometer at 150° F. Discoloration measured by Photovolt Reflectometer. Comparison made with outdoor exposure

| | Air Bomb (Percent retention of original tensile) | | Creep (Hours to 100%) | | Discoloration in White Rubber (Percent, initial refl./final rfl.) | |
|---|---|---|---|---|---|---|
| | White Rubber | Black Rubber | White Rubber | Black Rubber | Fadeometer | Outdoor Ariz. Exp. |
| Blank | 18 | 22 | 24 | 18 | 94 | 91 |
| 4,6-dinonyl-o-cresol | 46 | 47 | 53 | 32 | 98 | 94 |
| 4,6-didoecyl-o-cresol | 18 | 40 | 59 | 32 | 93 | 90 |
| 2,2'-methylenebis(4-methyl-6-t-butylphenol) | 66 | 50 | 63 | 38 | 96 | 90 |
| Thiobis(di-sec-amylphenol) | 39 | 42 | 47 | 32 | 95 | 87 |
| 4,4'-Methylenebis(6-t-butyl-o-cresol) | 49 | 45 | 59 | 30 | 89 | 88 |
| 4,4'-Thiobis(6-t-butyl-o-cresol) | 28 | 41 | 32 | 24 | 61 | 86 |

As may be noted from Table III, the performance of the 4,6-dinonyl-o-cresol was easily equivalent in antioxidant effectiveness to most of the commercial antioxidants. However, the 4,6-didodecyl-o-cresol, when used as an antioxidant in the white rubber stock, failed in the accelerated air bomb test.

The discoloration performance of the 4,6-dinonyl-o-cresol was outstanding. As shown by the Fade-Ometer reading, the performance of 4,6-dinonyl-o-cresol was superior to that of the blank in this accelerated discoloration test, effectively acting as a whitening or bleaching agent. Even more markedly, the 4,6-dinonyl-o-cresol was the only antioxidant which proved superior to the blank with respect to outdoor Arizona exposure. Outdoor exposure is essentially the only technique for evaluating the effect of the broad spectrum of ultraviolet produced by the sun. Since, additionally, crazing of the rubber sometimes occurs during outdoor exposure, this phenomenon, a low-temperature light-catalyzed degradation, cannot be effectively duplicated in the laboratory.

Example 5

The antioxidant effectiveness of 4,6-dinonyl-o-cresol, together with three commercial antioxidants as controls, as well as a blank, was determined in a blend consisting of 85 percent natural rubber and 15 percent synthetic cold styrene butadiene rubber (SBR 1502). The following recipe was used:

| | Parts by weight |
|---|---|
| Pale crepe rubber (natural) | 85.0 |
| SBR 1502 | 15.0 |
| Hard clay | 15.0 |
| Zinc oxide | 20.0 |
| Titanium dioxide | 35.0 |
| Stearic acid | 1.5 |
| 2,2'-dithiobis(benzothiazole) | 0.6 |
| Diphenylguanidine | 0.15 |
| Sulfur | 3.0 |
| Antioxidant (as shown) | 3.0 |

The stocks were cured at 292° F. for cure times of 15, 30, 45, and 60 minutes. The antioxidants were evaluated by air-oven aging at 212° F. for 48 hours and at 158° F. for 70 hours. The rubber stock containing the 4,6-dinonyl-o-cresol proved superior to the commercial antioxidants with respect to non-discoloring properties, and was equivalent in effectiveness with respect to antioxidant behavior.

Example 6

The anti-flex-cracking activity of 4,6-dinonyl-o-cresol was evaluated in a typical shoe sole recipe prepared from a 50–50 blend of synthetic styrene butadiene rubber (SBR 1500) and natural rubber. Comparison was made against two antioxidants used commercially to inhibit flex-cracking. Octamine, a mixed dioctyl diphenylamine, is used as the standard flex-cracking inhibitor in this field. The following recipe was used:

| | Parts by weight |
|---|---|
| SBR–1500 | 50.00 |
| Smoked sheets (natural rubber) | 50.00 |
| Styrene resin plasticizer | 25.00 |
| Hard clay | 25.00 |
| Calcium silicate | 50.00 |
| Zinc oxide | 5.00 |
| Stearic acid | 2.00 |
| Coumarone copolymer resin | 5.00 |
| Naphthenic softener | 3.00 |
| 2,2'-dithiobis(benzothiazole) | 1.25 |
| Diphenylguanidine | .25 |
| Sulfur | 3.00 |
| Antioxidant (as shown) | 2.00 |

The individual compounded stocks were cured for 12, 15, and 18 minutes at 320° F. and then aged for 24 hours at 100° C. in an air oven prior to test. The flex test used was essentially that set forth in ASTM D1052–55. The test specimens were subjected to flexing, and crack growth was measured at 125,000, 350,000 and 520,000 cycles. The averaged crack growth is reported in Table IV.

TABLE IV.—ANTI-FLEX CRACKING ACTIVITY

| | Average Crack Growth (inches) | Color Retention (rank) |
|---|---|---|
| Blank | .900 | |
| 4,6-dinonyl-o-cresol | .685 | 1 |
| Octamine (Diphenylamine-diisobutylene) | .665 | 3 |

On an over-all basis of average crack growth and color retention, 4,6-dinonyl-o-cresol would be selected as the most effective non-discoloring anti-flex cracking substance for white rubber stocks of those evaluated.

Example 7

Air-oven aging data were obtained for 4,6-dinonyl-o-cresol, and 2,6-di-t-butyl-p-cresol, a widely used commercial antioxidant. The following rubber recipe was used:

| | Parts by weight |
|---|---|
| Pale crepe rubber (natural) | 100.00 |
| Zinc oxide | 50.00 |
| TiO$_2$ | 25.00 |
| Stearic acid | 2.00 |
| Ultramarine blue | 0.125 |
| Mercaptobenzothiazole | 1.00 |
| Sulfur | 3.00 |

The samples were cured at 274° F. and then aged in a circulating air oven at 100° C. for 96 hours (ASTM D412, D573). The tensile strength of the aged samples was compared with that of the unaged samples. The results obtained are shown in Table V. It will be noted that the 2,6-di-t-butyl-p-cresol showed tensile-strength retention little better than the blank.

TABLE V

| | Tensile strength (percent retention) |
|---|---|
| Blank | 55.8 |
| 4,6-dinonyl-o-cresol | 78.3 |
| 2,6-di-t-butyl-p-cresol | 62.0 |

As may be noted from the foregoing exemplary data, rubber vulcanizates embodying 4,6-dinonyl-o-cresol have effective age resistance properties, show excellent resistance to flex cracking, and are outstanding in their non-staining and non-discoloring properties. Because of fthe increased emphasis on white and light-colored rubber products, such as white sidewall tires, where flexing resistance is additionally highly important, the rubber antioxidant herein set forth is an important contribution in this art.

It is to be understood that the invention of this application is not limited to the specific disclosures herein set forth, which have been presented as illustrations, since modifications in the proportions and types of materials employed may be made and equivalent materials may be employed where desirable, without departing from the spirit and scope of the invention as set forth in the objects thereof and defined in the following claims.

We claim:

1. A rubber composition containing natural rubber and, as a deterioration retarder, a small amount of 4,6-dinonyl-o-cresol.

2. A rubber composition according to claim 1 containing about 0.2 to 5 parts by weight of 4,6-dinonyl-o-cresol per 100 parts of rubber.

3. A white rubber composition normally subject to discoloration and containing natural rubber normally subject to oxidative deterioration, and as an antioxidant therefor about 0.2 to 5 parts by weight of 4,6-dinonyl-o-cresol per 100 parts of rubber.

References Cited

UNITED STATES PATENTS 2,581,907   1/1952   Smith et al. ____ 260—45.95 XR

DONALD E. CZAJA, *Primary Examiner.*

M. J. WELSH, *Assistant Examiner.*